(12) United States Patent
Kojo et al.

(10) Patent No.: US 8,843,276 B2
(45) Date of Patent: Sep. 23, 2014

(54) CONTROL DEVICE FOR STEERING TRANSMISSION RATIO VARIABLE DEVICE

(75) Inventors: Takahiro Kojo, Gotenba (JP); Yoshiaki Tsuchiya, Miyoshi (JP); Noritsugu Iwazaki, Shuntou-gun (JP); Tetsuya Morino, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 165 days.

(21) Appl. No.: 13/510,347

(22) PCT Filed: Nov. 18, 2010

(86) PCT No.: PCT/IB2010/002956
§ 371 (c)(1),
(2), (4) Date: May 17, 2012

(87) PCT Pub. No.: WO2011/061607
PCT Pub. Date: May 26, 2011

(65) Prior Publication Data
US 2012/0221208 A1 Aug. 30, 2012

(30) Foreign Application Priority Data
Nov. 20, 2009 (JP) ................ 2009-265483

(51) Int. Cl.
*A01B 69/00* (2006.01)
*B62D 6/00* (2006.01)
*B62D 11/00* (2006.01)
*B62D 5/00* (2006.01)
*B62D 5/04* (2006.01)

(52) U.S. Cl.
CPC .............. *B62D 5/008* (2013.01); *B62D 5/0469* (2013.01)
USPC ................. 701/41; 701/42; 180/443

(58) Field of Classification Search
USPC ...................... 701/41, 42; 318/432, 621, 624; 180/422, 444, 446, 443
See application file for complete search history.

(56) References Cited

U.S. PATENT DOCUMENTS

| 7,720,584 | B2 * | 5/2010 | Ogawa et al. .................. 701/42 |
| 2005/0039974 | A1 | 2/2005 | Hidaka |
| 2007/0052381 | A1 * | 3/2007 | Ueda et al. .................... 318/432 |
| 2011/0022268 | A1 | 1/2011 | Kojo |

FOREIGN PATENT DOCUMENTS

| FR | 2 858 961 | 2/2005 |
| JP | 2006103626 A * | 4/2006 |

(Continued)

OTHER PUBLICATIONS
International Search Report Issued Mar. 24, 2011 in PCT/IB10/02956 Filed Nov. 18, 2010.

*Primary Examiner* — Tuan C. To
*Assistant Examiner* — Isaac Smith
(74) *Attorney, Agent, or Firm* — Oblon, Spivak, McClelland, Maier & Neustadt, L.L.P.

(57) ABSTRACT

A device for controlling a steering transmission ratio variable device, which is provided with: a motor, which is able to apply a driving force that promotes relative rotation between a steering output shaft coupled to wheels to be turned and a steering input shaft that applies a steering input to the steering output shaft to one of either the steering output shaft or the steering input shaft; a motor driving device that drives the motor; and a locking device that is able to restrict the relative rotation, has a setting device that prescribes a drive voltage the motor and sets a damping gain, which acts in a direction that reduces a rotating speed of the motor, to a value that is larger than a reference value corresponding to an unlocked state during a locking control period in which a state of the steering transmission ratio variable device switches from an unlocked state in which the relative rotation is not restricted to a locked state in which the relative rotation is restricted.

7 Claims, 3 Drawing Sheets

(56) References Cited

FOREIGN PATENT DOCUMENTS

| | | |
|---|---|---|
| JP | 2008 68782 | 3/2008 |
| JP | 2009 143461 | 7/2009 |
| JP | 2009 166598 | 7/2009 |
| JP | 2009166598 A * | 7/2009 |
| WO | 2009 125271 | 10/2009 |

* cited by examiner

CONTROL DEVICE FOR STEERING TRANSMISSION RATIO VARIABLE DEVICE

The disclosure of Japanese Patent Applications No. 2009-265483 filed on Nov. 20, 2009, including the specification, drawings and abstract is incorporated herein by references in its entirety.

BACKGROUND OF THE INVENTION

1. Field of the Invention

The invention relates to the technical field of a controller for a steering transmission ratio variable device that controls a steering transmission ratio variable device represented by variable gear ratio steering (VGRS).

2. Description of the Related Art

Some steering transmission ratio variable devices are provided with a locking mechanism for restricting relative rotation of a steering input shaft and steering output shaft, and an example thereof is disclosed in Japanese Patent Application Publication No. 2008-068782 (JP-A-2008-068782). According to the steering transmission ratio variable device disclosed in JP-A-2008-068782, a driver can be prevented from being aware of a locking sound of the locking mechanism by generating an end contact sound originating in a mechanical stopper roughly simultaneous to the locking sound of the locking mechanism based on steering angular velocity and threshold steering angular velocity at the locking.

Furthermore, in the case VGRS is in a locked state, determination of a current limit value corresponding to the magnitude of an output torque has been proposed as described in, for example, Japanese Patent Application Publication No. 2009-166598 (JP-A-2009-166598).

According to the technical idea disclosed in JP-A-2008-068782, the timing at which locking of the locking mechanism is completed is roughly equal to the timing at which the turning angle of wheels to be turned reaches a turning angle end position (namely, end contact timing) determined based on the physical configuration of the steering mechanism.

Here, since the steering mechanism has high physical rigidity at the turning angle end position, in the case, for example, a driver has operated a steering wheel or other steering input device in a direction of increased turning at the turning angle end position or within a turning range in the vicinity thereof, steering torque as steering load increases suddenly.

On the other hand, although a steering transmission ratio variable device employs a configuration in which a steering input shaft and a steering output shaft are rotated relative to each other by an actuator that includes a motor, due to the nature of relative rotation, the motor is rotated in the case steering torque has been applied to the steering input shaft even though the steering output shaft is unable to rotate further at the turning angle end position.

At that time, since steering torque increases suddenly as previously described within a turning angle range in the vicinity of the turning angle end position, the motor rotating speed transiently and easily increases excessively. In particular, in a configuration in which motor rotating speed is transmitted to the steering output shaft after suitably reducing with a speed reduction mechanism, steering torque is transmitted to the motor accompanying an increase in speed corresponding to the gear ratio of the speed reduction mechanism.

Thus, in the device configuration disclosed in JP-A-2008-068782, a motor has the potential to excessively increase speed when a steering transmission ratio variable device is switched by a locking mechanism to a locked state in which the relative rotation is restricted. Since there are many cases in which locking mechanisms typically realize a locked state due to an engaging action of corresponding engaging members, in a device configuration of this type in which switching is carried out to a locked state at a turning angle end position or within a turning range in the vicinity of a turning angle end position, there is the potential for the load applied to the locking mechanism to become large when switching from an unlocked state to a locked state.

In addition, in a conventional device configuration that includes the device disclosed in JP-A-2008-068782, the motor frequently only supplies a so-called holding torque when switching to the locked state without considering changes in steering load when switching to the locked state. Thus, in the case steering load has changed excessively in the direction of increasing or decreasing during the switching period to the locked state without necessarily limiting to the turning angle end position or a turning angle range in the vicinity of the turning angle end position, the balance between steering load and holding torque is disrupted and the motor increases speed, thereby resulting in the possibility of a similar increase in the load applied to the locking mechanism.

On the other hand, problems occur in terms of costs and installability when an attempt is made to secure reliability for this large load.

In this manner, the technical idea disclosed in JP-A-2008-068782 has the technical shortcoming of being susceptible to an increase in the load applied to the locking mechanism. This applies similarly to the device disclosed in JP-A-2009-166598.

SUMMARY OF THE INVENTION

With the foregoing in view, the invention provides a controller for a steering transmission ratio variable device that is able to reduce the load applied to a locking mechanism.

Therefore, according to one aspect thereof, the invention provides a control device for a steering transmission ratio variable device provided with a motor, which is able to apply a driving force that promotes relative rotation between a steering output shaft coupled to wheels to be turned and a steering input shaft that applies a steering input to the steering output shaft to one of either the steering output shaft or the steering input shaft, a motor driving device that drives the motor, and a locking device that is able to restrict the relative rotation, wherein the control device is provided with a setting device that prescribes a drive voltage of the motor and sets a gain that acts on the motor, a determining device that determines the drive voltage of the motor based on the set gain, and a controller that controls the motor driving device so that the determined drive voltage is supplied to the motor, during a locking control period in which a state of the steering transmission ratio variable device switches from an unlocked state in which the relative rotation is not restricted to a locked state in which the relative rotation is restricted.

The steering transmission ratio variable device according to the invention is a device that enables relative rotation between a steering output shaft, which is suitably coupled to wheels to be turned through various types of steering mechanisms corresponding to various types of systems such as a rack and pinion system or ball and nut system, and a steering input shaft, which is coupled to various types of steering input devices such as a steering wheel. As a result of this relative rotation, a steering transmission ratio, which is the ratio of steering angle to turning angle, is able to be varied in steps or continuously. Furthermore, steering angle correlates with the angle of rotation of the steering input shaft, while turning angle is the turning angle of wheels to be turned and correlates with the angle of rotation of the steering output shaft.

There are no particular limitations on the detailed physical or electrical configuration of the steering transmission ratio variable device provided the technical concept described above is ensured. For example, the steering transmission ratio variable device may be provided with various types of gear mechanisms, speed reduction mechanisms or differential mechanisms and the like in a power transmission path between the motor and the steering output shaft.

The steering transmission ratio variable device according to the invention is provided with a locking device in addition to the motor for applying drive force that promotes the relative rotation and the motor driving device that serves as the driving device thereof.

The locking device according to the invention refers to a device capable of selectively restricting the above-mentioned relative rotation that enables variable control of steering transmission ratio. At this time, there are no particular limitations on the structure of the locking mechanism for putting the steering transmission ratio variable device into a locked state provided locking effects are ensured.

For example, as a preferable embodiment thereof, the locking device may have a mechanism provided with a pair of engaging elements composed of, for example, a lock holder and a lock lever, with one of the engaging elements being fixed either directly or indirectly on the steering input shaft and the other being fixed either directly or indirectly on the steering output shaft, whereby the relative rotation is restricted by physical engagement thereof (such as that in which the lock lever fits into an indentation formed around the periphery of the lock holder).

Furthermore, although "restriction" as referred to here means "prohibition" in the narrow sense, it has a meaning that includes restricting prominent or some degree of relative rotation with respect to an unlocked state in the broad sense. As is suitable hereinafter, a state in the steering transmission ratio variable device in which the relative rotation is restricted is referred to as a locked state, while a state in which it is not restricted is referred to as an unlocked state.

The controller for a steering transmission ratio variable device according to the invention is a device that controls this type of steering transmission ratio variable device, and can employ one or a plurality of practical aspects such as a central processing unit (CPU), microprocessing unit (MPU), electronic controlled unit (ECU) and various types of processors or various types of controllers. Furthermore, these may be internalized with or attached to various types of storage devices as necessary, such as read only memory (ROM), random access memory (RAM), buffer memory or flash memory.

In the controller for a steering transmission ratio variable device, the setting device preferably sets a damping gain, which acts in a direction that reduces the rotating speed of the motor, to be larger than a reference value corresponding to the unlocked state, while the determining device preferably determines a drive voltage of the motor based on the set damping gain.

According to this controller for a steering transmission ratio variable device, during a locking control period as a time period during which the steering transmission ratio variable device switches from an unlocked state to a locked state, the damping gain that prescribes the motor drive voltage is set based on that during the unlocked state. The determining device determines the motor drive voltage based on this set damping gain, and the controller controls the motor driving device so that this determined drive voltage is supplied to the motor.

Furthermore, the phrase "based on the set damping gain" indicates that the determining device is not necessarily required to determine the motor drive voltage with reference only to the set damping gain. On the contrary, the damping gain may preferably have an effect on a portion (a damping term, as explained later) of a plurality of control terms that prescribe the drive voltage.

Here, "damping gain" is a coefficient that prescribes a damping term among various control terms that prescribe a motor drive voltage determined in accordance with various control rules such as feedback (F/B) control or feed forward (F/F) control relating to control of motor position (angle of rotation) or control of speed (differential value of angle of rotation).

Since the damping term itself is a control term that gives rise to an attenuation of motor speed, as a result of damping gain being set to a larger value than that in the unlocked state and being used for actual control relating to the determining device and the controller, at least increases in motor speed are alleviated during the locking control period. In addition, motor speed ideally decreases. In particular, if damping gain is set to an adequately large value, the motor can also be substantially stopped or put into a state approximate thereto during the locking control period.

Furthermore, in the invention, the aspect of the motor control during an ordinary control period other than the locking control period is not limited regardless of its availability. For example, as a preferable embodiment thereof, driving of the motor may be controlled by using as the main control rule positional F/B control based on positional deviation constituting deviation between a target position and a current position. In this case, a steady state term is determined as a portion of the control terms that prescribe drive voltage by a steady state gain as a gain for positional deviation, and the motor drive voltage may be determined by using this steady state term as a main element.

On the other hand, during the locking control period, these control rules during the ordinary control period may be maintained, may be temporarily suspended or may be replaced with other control rules over time. In any case, increases in motor speed can be restricted by increasing the damping gain.

Furthermore, there are various conditions for switching to the locked state, including conventional ones, although they are not summarily prescribed, from the viewpoint of turning angle, it is reasonable for the turning angle to be at the turning angle end position or within a turning range in the vicinity thereof, and in this case, from the viewpoint of protecting the motor with respect to excessive steering input at the turning angle end position as previously described, the steady state gain during the locking control period may be changed gradually in the direction of reduction.

Conversely, even if the locking device is assumed to control relative rotation on the basis of some form of physical action, the physical impact applied to the locking device at the time locking is completed can be correlated with the rotating speed of the motor. Thus, during the locking control period, increases in motor speed as previously described can be restricted and the motor can be maintained in a stopped state or roughly stopped state (here, a "roughly stopped state" refers to a rotating state to a degree to which the physical impact applied to engaging elements at completion of locking can be held to within an allowable range). According to the controller as described above, a large impact can be preferably restricted from being applied to the locking device when the steering transmission ratio variable device switches to a locked state. Namely, according to the controller according to the invention, a load applied to a locking mechanism can be reduced.

Furthermore, the "locking control period" according to the invention is not required to be a time period strictly prescribed in terms of a time series, and has a considerably high degree of freedom. However, from the viewpoint of more reliably reducing the load applied to the locking device, it is preferably a time period that includes the time at which locking is completed (for example, the time at which engaging elements consisting of engaging elements of the steering input shaft and engaging elements of the steering output shaft have completely fit together). In addition, it goes without saying that the operation for setting damping gain relating to the setting device is at least initiated at a time prior to the time locking is completed.

As a supplementary explanation of the above, in the case the locking device employs a configuration in which a lock lever engages with the outer periphery of a lock holder, the presence or absence of locking is prescribed only by the presence or absence of the supply of electromagnetic force to the lock lever. In such a case, whether or not switching to the locked state has been completed is not understood as an actual state in the strict sense. The locking control period in such cases may be the time period from the time locking conditions have been satisfied or the time the supply of electromagnetic force has been discontinued to the time at which a time at which the lock lever can be considered to have been reliably inserted into the lock holder has elapsed based on a preliminary experiment, experience, theory or a simulation and the like.

In addition, although the "locking control period" may include the time at which the turning angle of wheels to be turned reaches a turning end position or the vicinity thereof, which is the physical operating limit of the steering mechanism, the operation for setting the damping gain relating to the setting device is preferably initiated at a time at least prior to the time the turning angle of the wheels to be turned reaches the turning angle end position or the vicinity thereof.

Namely, the controller realizes the technical idea of causing the steering transmission ratio variable device to switch to a locked state in a state in which increases in motor speed caused by changes in steering load are restricted by giving priority to a damping term that prescribes drive voltage over other control terms.

Thus, as long as this technical idea is able to be embodied, the setting device may initiate correction of damping gain (namely, setting damping gain in the direction in which it increases) or complete correction of damping gain at any time.

In addition, the practical meaning of "damping gain" (and more directly, the position at which the gain is inserted into a control loop) varies corresponding to the structure of the control system, and limiting it in detail deviates from the technical essence of the controller.

In addition, the setting device preferably sets the steady state gain that acts in a direction that causes convergence of positional deviation of the motor in accordance with the specified steering load so as to correspond to the respective magnitude of an increase or decrease in the steering load, while the determining device preferably determines the motor drive voltage based on the set steady state gain.

According to the controller for a steering transmission ratio variable device as described above, steering load such as steering torque is specified by a specifying device, and the steady state gain is set corresponding to this specified steering load during the above-mentioned locking control period. The determining device determines the motor drive voltage based on this set steady state gain, and the controller controls the motor driving device in accordance therewith.

Here, "steady state gain" refers to a coefficient that prescribes a steady state term (proportional term) among various types of control terms that prescribe motor drive voltage that is prescribed in accordance with control rules such as F/B control or F/F control relating to control of motor position (angle of rotation) or control of speed (differential value of angle of rotation).

According to the controller as described above, this steady state gain is increased when the steering load tends to increase or decreased when the steering load tends to decrease. At this time, it is not necessarily required for the specified steering load to be binarily classified to an increasing trend or decreasing trend. For example, a type of dead zone may be formed by comparing threshold values respectively set on the increasing side and decreasing side.

On the one hand, in the case the steering load tends to increase, from the viewpoint of the motor, in a sense this is equivalent to the motor "being turned" in that it is operating passively according to the steering load. Under such circumstances, increases in motor speed caused by the steering load can be restricted by correcting the steady state gain in the increasing direction.

On the other hand, in the case the steering load tends to decrease, again from the viewpoint of the motor, this is equivalent to the motor accelerating in accordance with a target value of the drive, voltage (target drive voltage). Under these circumstances, increases in motor speed caused by the steering load can again be restricted by correcting the steady state gain in the decreasing direction.

In this manner, according to the controller as described above, the balance between motor load and motor torque can be maintained and increases in motor speed caused by the steering load can be restricted by respectively or increasing or decreasing the motor drive voltage in response to an increase or decrease in the steering load. Thus, the application of a large load to the locking device caused by an increase in motor speed attributable to a change in the steering load can be preferably prevented.

Namely, the above-mentioned controller realizes the technical idea of causing the steering transmission ratio variable device to switch to a locked state in a state in which increases in motor speed caused by changes in steering load are restricted by reliably controlling a steady state term that prescribes drive voltage corresponding to the steering load.

As a supplemental explanation thereof, in the controller as described above, when causing the steering transmission ratio variable device to switch to a locked state, the control aspect of the motor switches from positional control, which is unstable with respect to changes in steering load, to speed control, which is comparatively robust with respect to changes in steering load, thereby restricting increases in motor speed.

Thus, setting of steady state gain corresponding to the steering load at this time may be carried out in conjunction with controlling increases in damping gain relating to the controller. In this case, in practical terms, correction of steady state gain corresponding to the steering load may be suitably carried out after the steady state gain has basically gradually changed to the attenuating side during the locking control period.

Furthermore, in the case the steering transmission ratio variable device or a vehicle equipped with a steering transmission ratio variable device is provided with a detecting device capable of detecting steering torque, for example, the specifying device may specify the steering load by acquiring a detection value of the detecting device. Alternatively, the specifying device may specify the steering load as a result of a numerical calculation or logical operation using various types of alternative indicator values such as a target drive voltage, pinion angle (which is synonymous with turning angle), pinion angular velocity or turning angular velocity set in accordance with motor speed, motor acceleration or control rules.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

The following provides an explanation of embodiments according to a vehicle steering controller of the invention while suitably referring to the drawings. To begin with, an explanation is provided of the configuration of a vehicle 10 according to an embodiment of the invention with reference to FIG. 1. Here, FIG. 1 is a schematic block diagram conceptually representing the configuration of the vehicle 10.

Figure 1:
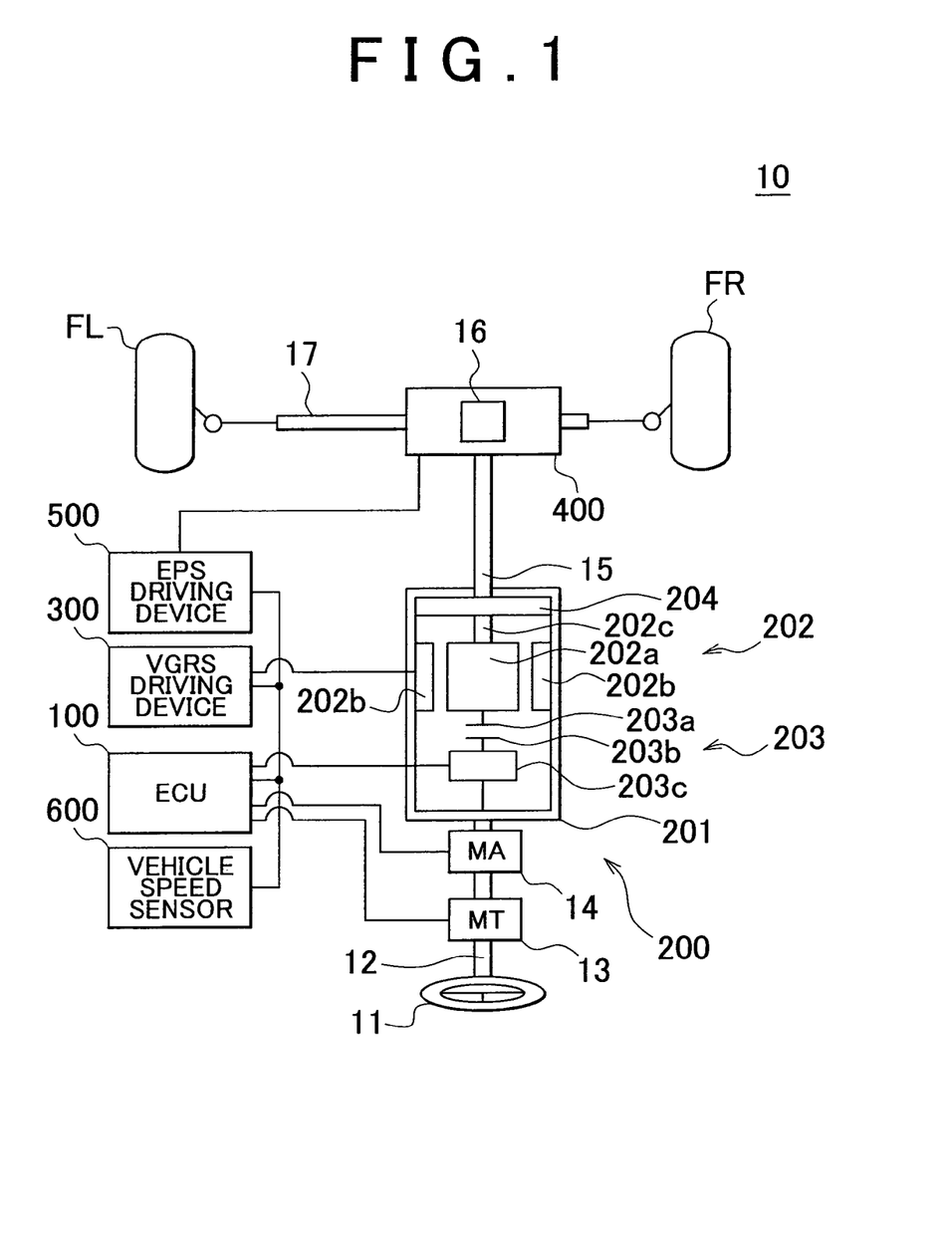
FIG. 1 is a schematic block diagram conceptually representing the configuration of a vehicle according to an embodiment of the invention.

In FIG. 1, the vehicle 10 is provided with a pair of laterally symmetrical front wheels FL and FR as wheels to be turned, and the vehicle 10 is composed to be able to proceed in a desired direction by turning the front wheels.

The vehicle 10 is provided with an ECU 100, a VGRS actuator 200, a VGRS driving device 300, an electronic power steering system (EPS) actuator 400, and EPS driving device 500 and a vehicle speed sensor 600.

The ECU 100 is an electronic control unit provided with a CPU, ROM and RAM, each of which is not shown, is configured to enable control of all operations of the vehicle 10, and is an example of a "controller for a steering transmission ratio variable device" according to the invention. The ECU 100 is configured to be able to execute locking control to be described later in accordance with a control program installed in the ROM.

In the vehicle 10, a steering load applied by a driver through a steering wheel 11 is transmitted to an upper steering shaft 12 that is a shaft body coaxially and rotatably coupled to the steering wheel 11 and capable of rotating in the same direction as the steering wheel 11. The upper steering shaft 12 is an example of the "steering input shaft" according to the invention. The upper steering shaft 12 is coupled to the VGRS actuator 200 on the end on the downstream side thereof.

The VGRS actuator 200 is provided with a housing 201, a VGRS motor 202, a locking mechanism 203 and a speed reduction mechanism 204.

The housing 201 is a case for the VGRS actuator 200 that houses the VGRS motor 202, the locking mechanism 203 and the speed reduction mechanism 204. The end on the downstream side of the previously described upper steering shaft 12 is fixed to the housing 201, and the housing 201 is able to rotate roughly integrally with the upper steering shaft 12.

The VGRS motor 202 has a rotor that is a rotor 202a, a stator that is a stator 202b, and a driving force output shaft that is a rotating shaft 202c, and is a DC brushless motor that is an example of the "motor" according to the invention. The stator 202b is fixed within the housing 201, and the rotor 202a is rotatably held within the housing 201. The rotating shaft 202c is coaxially fixed to the rotor 202a, and together with being able integrally rotate with the rotor 202a, the end on the downstream side thereof is coupled to the speed reduction mechanism 204.

The speed reduction mechanism 204 is a gear device composed of a stator gear fixed to the housing 201, a flexible gear rotatably held within the stator gear, a driven gear coaxially arranged with the flexible gear and fixed to a lower steering shaft 15, and a wave generator coupled to the rotating shaft 202c of the VGRS motor 202. The speed reduction mechanism 204 is composed to be able to transmit rotation of the upper steering shaft 12 and the VGRS motor 202 to the lower steering shaft 15 after reducing speed in accordance with a speed reduction ratio determined corresponding to the respective gear ratio of each gear. On the other hand, the speed reduction mechanism 204 is composed such that rotation of the upper steering shaft 12 corresponding to the steering load of the driver is transmitted to the lower steering shaft 15 through a power transmission path sequentially interposed with the stator gear, flexible gear and driven gear.

The speed reduction mechanism 204 has a function that causes relative rotation between the upper steering shaft 12 and the lower steering shaft 15.

More specifically, in the configuration described above, when the rotor 202a of the VGRS motor 202 rotates, the drive torque thereof is transmitted to the flexible gear, which makes partial contact with a cam provided as a power transmitting member in the wave generator, through that cam, thereby causing rotation of the flexible gear. This flexible gear turns within the stator gear and further causes rotation of the driven gear in a coaxial relationship therewith.

Thus, according to the VGRS actuator 200, the angle of rotation of the lower steering shaft 15 does not exclusively refer to the angle of rotation of the upper steering shaft 12, and the upper steering shaft 12 and the lower steering shaft 15 are able to rotate relative to each other.

Namely, according to the VGRS actuator 200, the angle of relative rotation of the lower steering shaft 15 relative to the upper steering shaft 12 can be controlled to increase or decrease by controlling the position (angle of rotation) of the VGRS motor 202 to increase or decrease.

In the vehicle 10, as a result of allowing relative rotation between the upper steering shaft 12 and the lower steering shaft 15 in this manner, the ratio between the angle of rotation of the upper steering shaft 12 that is a steering angle MA and a front wheel turning angle δf, which is exclusively determined corresponding to the angle of rotation of the lower steering shaft 15 (and also involves a gear ratio of a rack and pinion mechanism to be described later), that is a steering transmission ratio R can be continuously and variably controlled within a predetermined range. Furthermore, although not shown in the drawing, the front wheel turning angle δf is detected by a turning angle sensor and can be referred to by the ECU 100 electrically connected thereto.

Furthermore, the speed reduction mechanism 204 is not limited to the configuration exemplified here that includes a wave generator, but rather may also have various types of conventional aspects. For example, the speed reduction mechanism may be a planetary gear mechanism provided with a plurality of rotating elements in a mutually differential relationship. At this time, each rotating element may be respectively coupled to the rotating shaft 202c, the housing 201 and the lower steering shaft 15.

Furthermore, although not shown in the drawing, an angle of rotation sensor such as rotary encoder is provided in the VGRS motor 202 that is composed to be able to detect an angle of rotation θ of the rotating shaft 202c. This angle of rotation sensor is electrically connected to the ECU 100, and is composed such that the detected angle of rotation θ is referred to by the ECU 100 at regular or irregular periods.

The locking mechanism 203 is an example of the "locking device" according to the invention provided with a lock holder 203a, a lock lever 203b and a solenoid 203c.

The lock holder 203a is a disc-shaped member fixed to the rotor 202a of the VGRS motor 202 and capable of integrally rotating with the rotor 202a. A plurality of indentations are formed along the circumferential direction in the outer periphery of the lock holder 203a.

The lock lever 203b is a key-shaped engaging member of which one end is fixed to a stationary site provided on the housing 201 of the VGRS actuator 200 and which is rotatably composed by using the stationary site as an axial fulcrum. A protrusion capable of fitting into the indentations formed in the outer periphery of the lock holder 203a is formed on the other end of the lock lever 203b. In addition, this other end of the lock lever 203b is urged in the direction of the indentations formed in the lock holder 203a by a spring not shown.

The solenoid 203c is a solenoid actuator capable of applying electromagnetic force to the lock lever 203b that overcomes the urging of the spring as described above. When in a state in which the electromagnetic force is applied from the solenoid 203c, the lock lever 203b overcomes the urging of the spring, and the protrusion formed on the end thereof is maintained in an unlocked state in which it does not engage with the indentations of the lock holder 203a.

On the other hand, when the application of electromagnetic force from the solenoid 203c is stopped, the lock lever 203b is rotated towards the lock holder 203a by urging of the spring and ultimately stops at a locked position at which it fits into the indentations formed in the lock holder 203a corresponding to the rotation status of the lock holder 203a. The solenoid 203c is electrically connected to the ECU 100, and is composed so that its driving status is controlled by the ECU 100.

In the case the lock lever 203b is in the locked position, the VGRS actuator 200 is in a locked state in which the VGRS motor 202 and the upper steering shaft 12 are mechanically coupled by the locking mechanism 203.

In the case the VGRS actuator 200 is in the locked state, the upper steering shaft 12 and the lower steering shaft 15 are unable to rotate relative to each other, and the previously described steering transmission ratio R is fixed to a single value.

The VGRS driving device 300 is an electric driving circuit including, for example, a PWM circuit, a transistor circuit and an inverter that is composed so as to be able to apply current to the VGRS motor 202 and the stator 202b. The VGRS driving device 300 is electrically connected to a battery not shown, and is composed to be able to supply a drive voltage V to the VGRS motor 202 using electrical power supplied from the battery. In addition, the VGRS driving device 300 is electrically connected to the ECU 100, and is composed so that the operation thereof is controlled by the ECU 100.

The EPS actuator 400 is an device that includes a rotor not shown serving as a rotor to which is attached a permanent magnet and which is fixed to the lower steering shaft 15 on the downstream side of the. VGRS motor 202, and a DC brushless motor provided with a stator serving as a stator that surrounds the rotor.

The EPS actuator 400 is a so-called pinion assist type of actuator that is composed to be able to supply a drive torque to a pinion gear 16 to be described later that assists rotation of the pinion gear 16. The EPS actuator 400 is composed to generate an assist torque Tm in the direction of rotation of a rotor as a result of the rotor being rotated by the action of a rotating magnetic field formed within the EPS actuator 400 by applying current to the stator via the EPS driving device 500.

The EPS driving device 500 is an electric driving circuit composed to be able to control the state of the rotating magnetic field formed within the EPS actuator 400 by applying current to the stator of the EPS actuator 400. The EPS driving device 500 is electrically connected to the ECU 100 and is composed so that the operation thereof is controlled by the ECU 100. Furthermore, in the following explanations, the term "EPS" is suitably used as a concept that includes both the EPS actuator 400 and the EPS driving device 500.

Rotation of the lower steering shaft 15 that suitably receives application of the assist torque Tm from the EPS actuator 400 is transmitted to a steering mechanism as a rack and pinion mechanism that includes the pinion gear 16 and a rack bar 17 in which gear teeth are formed that mesh with gear teeth of the pinion gear 16.

In the rack and pinion mechanism, rotation of the pinion gear 16 connected to end on the downstream side of the lower steering shaft 15 is converted to motion of the rack bar 17 in the lateral direction as shown in the drawing. This reciprocating motion of the rack bar 17 is composed to be transmitted to each wheel to be turned through a tie rod and knuckle (not shown) coupled to the end on the downstream side of the rack bar 17.

Furthermore, a steering mechanism that complies with, for example, a ball and nut system or other steering mechanism may also be employed for the steering system of the vehicle 10. In addition, even in the case of employing a rack and pinion type of steering mechanism, there are no particular limitations on, for example, the types or shapes of constituent elements or the mutual spatial arrangement of the constituent elements at least within the range of substantial restrictions based on installation space, cost, durability or reliability and the like (assuming that such restrictions exist).

Furthermore, the configuration of the EPS actuator 400 merely represents one example of a power steering device that assists the steering torque of a driver, and for example, the assist torque Tm may be transmitted to the lower steering shaft 15 accompanying a reduction in rotating speed by a speed reduction gear not shown, or may be transmitted as force that assists the reciprocating motion of the rack bar 17 instead of rotational motion of the lower steering shaft 15.

On the other hand, the vehicle 10 is provided with various types of sensors including a steering torque sensor 13, a steering angle sensor 14 and the vehicle speed sensor 600.

The steering torque sensor 13 is a sensor composed to be able to detect a steering torque MT applied by a driver through the steering wheel 11. More specifically, The upper steering shaft 12 has a configuration in which it is divided into an upstream portion and a downstream portion that are mutually coupled by a torsion bar not shown. Rings for detecting a rotational phase difference are fixed to both ends of the torsion bar on the upstream side and downstream side. This torsion bar is composed to twist in the direction of rotation corresponding to steering torque transmitted through the upstream portion of the upper steering shaft 12 when the steering wheel 11 has been turned by a driver of the vehicle 10, and is able to transmit steering torque to the downstream portion while generating that torsion.

Thus, a mutual rotational phase difference is generated between the rings for detecting a rotational phase difference as previously described during transmission of steering torque. In addition to detecting the rotational phase difference, the torque sensor 13 is composed to be able to output the rotational phase difference as an electrical signal corresponding to the steering torque MT by converting to steering torque. In addition, the steering torque sensor 13 is electrically connected to the ECU 100, and the detected steering torque MT is composed so as to be referred by the ECU 100 at regular or irregular periods.

The steering angle sensor 14 is a sensor composed to be able to detect a steering angle δst that is the angle of rotation of the upper steering shaft 12. The steering angle sensor 14 is electrically connected to the ECU 100, and the detected steering angle δst is composed to be referred to by the ECU 100 at regular or irregular periods.

The vehicle speed sensor 600 is a sensor capable of detecting a vehicle speed Vh of the vehicle 10. The vehicle speed sensor 600 is electrically connected to the ECU 100, and the detected vehicle speed Vh is composed to be referred to by the ECU 100 at regular or irregular periods.

The following provides an explanation of the operation of the embodiment while suitably referring to the drawings.

Figure 2:
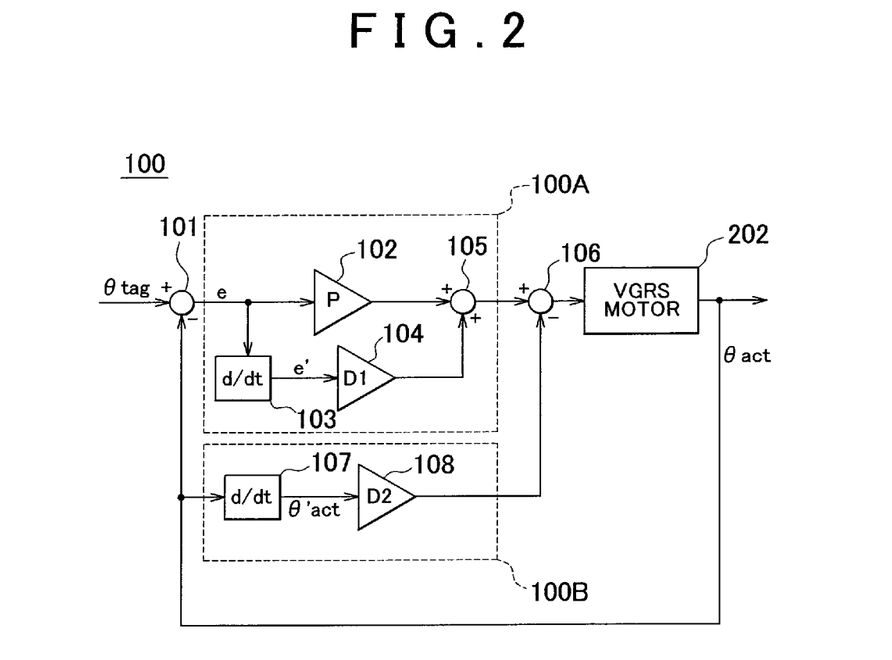
FIG. 2 is a driving control block diagram of a VGRS actuator in an ECU in an embodiment.

An explanation is first provided of a basic control aspect of the VGRS actuator 200 with reference to FIG. 2. FIG. 2 is a driving control block diagram of the VGRS actuator 200 in the ECU 100.

In FIG. 2, the ECU 100 is composed by including a subtractor 101, an amplifier 102, a differentiator 103, an amplifier 104, an adder 105, a subtractor 106, a differentiator 107 and an amplifier 108.

the subtractor 101 is an operator that accepts a target position (target angle of rotation) θtag of the VGRS motor 202 and a current position (current angle of rotation) θact of the VGRS motor 202, and outputs their deviation (θtag−θact) that is a positional deviation e as an output value.

The amplifier 102 is an operator that amplifies the positional deviation e as an input value by a steady state gain P. The steady state gain P is an example of the "steady state gain" according to the invention. The amplifier 102 is composed to output a steady state voltage Vp (Vp=e×P) as a steady state term of the drive voltage V of the VGRS motor 202 that is proportional to the positional deviation e. Furthermore, the steady state gain P is set to Pbase during ordinary control.

The differentiator 103 is an operator that time-differentiates the positional deviation e that is an input value and outputs the time-differentiated value e' as an output value.

The amplifier 104 is an operator that amplifies the time-differentiated value e' that is an input value by a damping gain D1. The amplifier 104 is composed to output a damping voltage Vd1 (Vd1=e'×D1) as a damping term of the drive voltage V of the VGRS motor 202 that corresponds to the time-differentiated value e'.

The adder 105 is an operator that adds the steady state voltage Vp and the damping voltage Vd1.

Here, in the ECU 100, the subtractor 101, the amplifier 102, the differentiator 103, the amplifier 104 and the adder 105 compose a position control block 100A. The position control block 100A is a control block that realizes a positional deviation F/B for causing the position (angle of rotation) of the VGRS motor 202 to converge on a target position (target angle of rotation), and the output value of the adder 105 is a position control voltage of the control terms that compose the drive voltage V of the VGRS motor 202 that corresponds to the positional deviation F/B.

The differentiator 107 is an operator that time-differentiates the current position θact of the VGRS motor 202 that is an input value, and outputs a time-differentiated value θ'act as an output value. Furthermore, the time-differentiated value θ'act is equivalent to the actual rotating speed of the VGRS motor 202. Thus, this time-differentiated value θ'act is hereinafter referred to as "actual rotating speed θ'act".

The amplifier 108 is an operator that amplifies the actual rotating speed θ'act of the VGRS motor 202 that is an input value by a damping gain D2. The amplifier 108 is composed to output a damping voltage Vd2 (Vd2=θ'act×D2) as a damping term of the drive voltage V of the VGRS motor 202 that corresponds to the actual rotating speed θ'act. Furthermore, the damping gain D2 is an example of the "damping gain" according to the invention. Furthermore, the damping gain D2 is set to D2base during ordinary control.

Here, in the ECU 100, the differentiator 107 and the amplifier 108 compose a speed control block 100B. The speed control block 100B is a control block that realizes a rotating speed F/B for stabilizing the rotating speed of the VGRS motor 202, and the damping voltage Vd2 that is an output value of the amplifier 108 is a rotating speed control voltage of the control terms that compose the drive voltage V of the VGRS motor 202 that corresponds to the rotating speed F/B.

The subtractor 106 is an operator that subtracts the rotating speed control voltage from the position control voltage. The output value of the subtractor 106 is the final drive voltage V of the VGRS motor 202, and is composed to drive the VGRS motor 202 via the VGRS driving device 300. Furthermore, during ordinary control, driving of the VGRS motor 202 is mainly controlled by using the position control block 100A as the main control rule. Namely, the drive voltage V of the VGRS motor 202 is determined using the steady state voltage Vp as a determining element. In other words, the steady state gain Pbase, the damping gain D1base and the damping gain D2base during ordinary control are respectively determined so that the steady state voltage Vp serves as the determining element.

Figure 3:
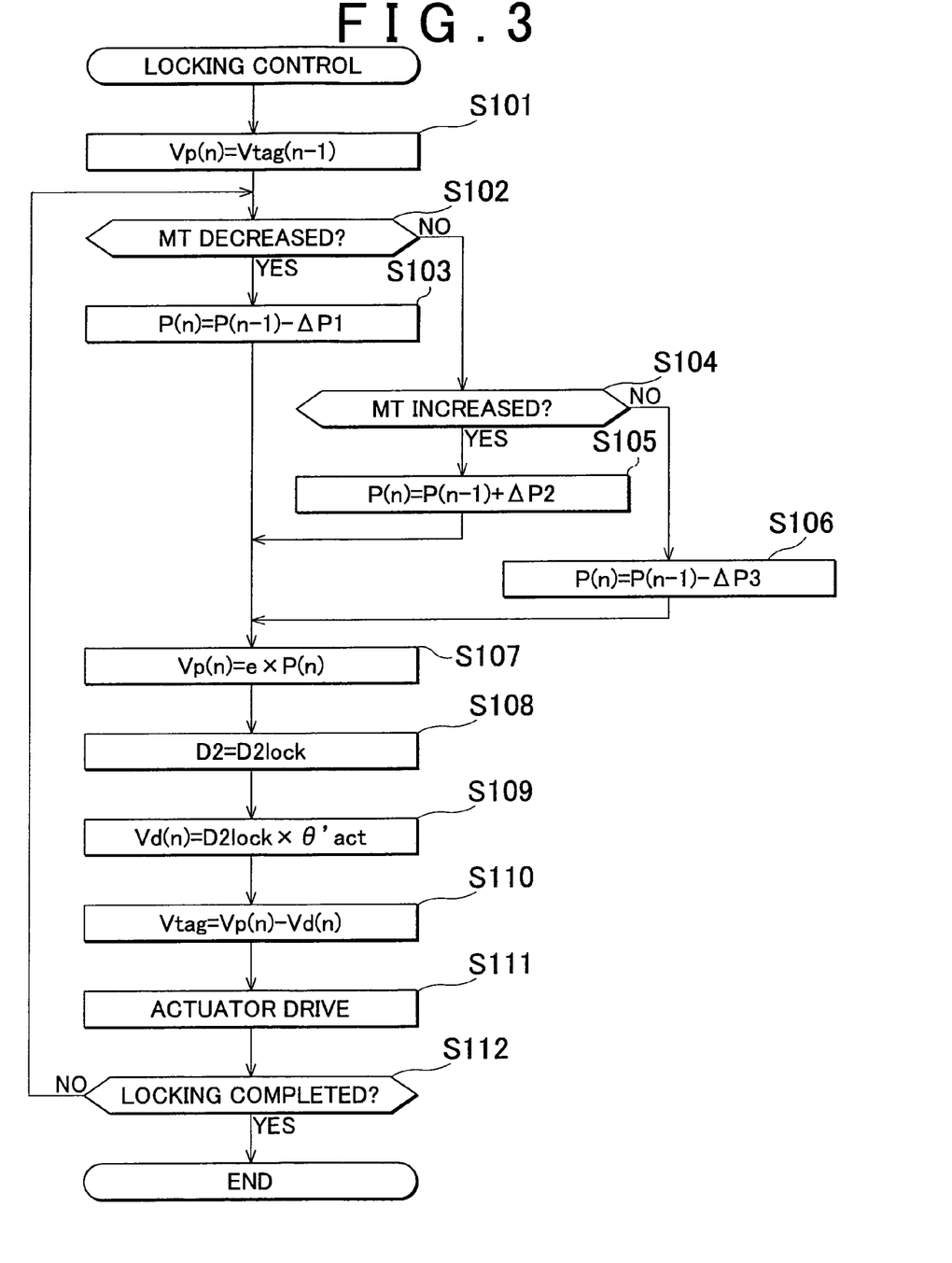
FIG. 3 is a flow chart of locking control executed by an ECU.

Next, a detailed explanation is provided of locking control executed by the ECU 100 when the VGRS actuator 200 is switched from an unlocked state to a locked state with reference to FIG. 3. FIG. 3 is a flow chart of locking control.

Furthermore, this block control is executed in the case locking control is required (namely, when locking conditions have been satisfied) in a control routine that determines whether or not locking control is required. Since various types of aspects can be applied, regardless of whether conventional or not, for the aspect relating to determining whether or not locking control is required, the details thereof are omitted here. Furthermore, when the locking control is initiated, the ECU 100 stops the application of current to the solenoid 203c as previously described. When application of current to the solenoid 203c is stopped and supply of electromagnetic force that overcomes the urging force of the spring is interrupted, the lock lever 203b of the locking mechanism 203 begins to rotate from the previously described unlocked state. At this time, although the lock lever 203b does not necessarily fit into the indentations of the lock holder 203a immediately after interruption of the supply of electromagnetic force, once the lock holder 203a and the lock lever 203b have fit together, the locked state is maintained until application of current to the solenoid 203c is resumed.

Furthermore, locking control may also be determined to be required in the case the steering torque MT exceeds a threshold value or the case the steering angular velocity (time-differentiated value of the steering angle MA) has exceeded a threshold value. Alternatively, locking control may also be determined to be required in the assistance of the steering torque MT by the EPS actuator 400 has stopped (this is because, since the form of the VGRS motor 202 is inherently determined on the premise that the load applied to the VGRS motor 202 is reduced by application of the assist torque Tm by the EPS actuator 400, in the case application of the assist torque Tm is stopped, there is a high possibility of the axial force applied to the lower steering shaft 15 during steering exceeding the maximum torque of the VGRS motor 202).

In FIG. 3, when the locking control is initiated, the ECU 100 first latches the current value Vp(n) of the steady state voltage Vp to the most recent value (namely, the value at the time of one control earlier) Vtag(n−1) of a target drive voltage Vtag that is a target value of drive voltage (Step S101).

When the steady state voltage Vp(n) has been latched, the ECU 100 acquires the steering torque MT and determines whether or not the steering torque MT as a steering load is decreasing (Step S102). At this time, in the case the amount of change in the steering torque MT acquired via the steering torque sensor 13 is equal to or less than a preset reference value (negative value), the ECU 100 determines that the steering torque MT is decreasing.

Furthermore, the detected value of the steering torque sensor 13 may not necessarily be suitable for locking control of the VGRS actuator 200 for reasons such as having a dynamic range that has been optimized for driving control of the EPS actuator 400. In such a case, the ECU 100 may determine whether or not the steering torque MT as a steering load is decreasing (namely, whether or not the VGRS motor 202 is in an accelerated state due to driving control corresponding to the target drive voltage Vtag) by making a comprehensive determination based on, for example, the rotating speed of the VGRS motor 202 (namely, θ'act), rotational acceleration of the VGRS motor 202 (namely the time-differentiated value of θ'act) and the target drive voltage Vtag of the VGRS motor 202. Since a determination based on these alternative indicator values is made in accordance with the actual state (an actual phenomenon) of the VGRS actuator 200, it provides higher accuracy than a determination based on the detected steering torque MT.

In the case the steering torque MT has been determined to be decreasing (YES in Step S102), the ECU 100 sets the steady state gain P(n) to value obtained by subtracting a gradually changing amount ΔP1 (ΔP1>0) from the value at the time of one control earlier P(n−1) (Step S103). Furthermore, the steady state gain P(n−1) immediately after initiating locking control is; in other words, the steady state gain Pbase during ordinary control.

On the other hand, in the case the steering torque MT has not decreased (NO in Step S102), the ECU 100 determines whether or not the steering torque MT is increasing (Step S104). The ECU 100 determines that the steering torque MT is increasing in the case the amount of change in the steering torque MT acquired via the steering torque sensor 13 at this time is equal to or greater than a preset reference value (positive value).

Furthermore, as was previously described, the detected value of the steering torque sensor 13 may not necessarily be suitable for locking control of the VGRS actuator 200. In such a case, the ECU 100 may determine whether or not the steering torque MT as the steering load is increasing (namely, whether or not the VGRS motor 202 is being rotated by the steering load) according to a comprehensive determination based on the pinion angle or front wheel turning angle δf that is the angle of rotation of the pinion gear 16, the pinion angular velocity that is the time-differentiated value of the pinion angle or the turning angular velocity that is the time-differentiated value of the front wheel turning angle δf, and the target drive voltage Vtag of the VGRS motor 202. Determination based on these alternative indicator values yields higher accuracy than determination based on a detected steering torque MT since the determination is made in accordance with the actual state (an actual phenomenon) of the VGRS actuator 200.

In the case it has been determined that the steering torque MT is increasing (YES in Step S104), the ECU 100 sets the steady state gain P(n) to value obtained by adding a gradually changing amount ΔP2 (ΔP2>0) to the value at the time of one control earlier P(n−1) (Step S105). Furthermore, the steady state gain P(n−1) immediately after initiating locking control is, in other words, the steady state gain Pbase during ordinary control.

On the other hand, in the case the steering torque MT is not increasing (NO in Step S104), namely in the case the steering load has changed within a preset allowable range, the ECU 100 sets the steady state gain P(n) to a value obtained by subtracting a gradually changing amount ΔP3 (ΔP1>ΔP3>0) to the value at the time of one control earlier P(n−1) (Step S106). Furthermore, the steady state gain P(n−1) immediately after initiating locking control is, in other words, the steady state gain Pbase during ordinary control.

When Step S103, Step S105 or Step S106 is executed, the ECU 100 calculates the steady state voltage Vp, which prescribes the drive voltage V of the VGRS motor 202, in accordance with the following formula (1) (Step S107). Furthermore, the operation relating to Step S107 is equivalent to the operation of the amplifier 102 in FIG. 2.

$$Vp(n) = e \times P(n) \quad (1)$$

Here, when Step S103 is executed, since the steady state gain P decreases from the previous value, the steady state voltage Vp also decreases if the positional deviation e is constant. As a result, increases in speed of the VGRS motor 202 caused by a decrease in the steering load are restricted.

In addition, when Step S105 is executed, since the steady state gain P increases from the previous value, the steady state voltage Vp also increases if the positional deviation e is constant. As a result, increases in speed of the VGRS motor 202 caused by an increase in the steering load are restricted.

Namely, Steps S103 and S105 constitute an example of operation of the setting device (the second controller in the invention) that "sets the steady state gain corresponding to the steering load so as to correspond to the respective magnitude of an increase or decrease in the steering load" according to the invention.

With the exception of cases in which a large fluctuation occurs in the steering load in this manner, the steady state gain P is gradually changed towards zero by the operation of Step S106, and the steady state gain P decreases for each control period. Thus, during locking control, the steady state gain P basically follows a decreasing trend and increases in speed of the VGRS motor 202 are restricted.

A decrease in the steady state gain P means that the effect of the position control block 100A on determination of the drive voltage V has decreased relative thereto, and the effect of the speed control block 100B has increased relative thereto. Namely, the control rule of the VGRS motor 202 is gradually switched from position control F/B to speed control F/B by Step S106 during the execution period of locking control (which is an example of the "locking control period" according to the invention).

Once the steady state voltage Vp has been determined, the ECU 100 switches the damping gain D2 relating to the amplifier 108 of the speed control block 100B from D2base for ordinary control (which is an example of the "reference value corresponding to the unlocked state" according to the invention) to D2lock (D2lock>>D2base) that is set for locking control (Step S108). The operation relating to Step S108 is an example of the operation of the "first controller according to the invention" that "sets the damping gain to be larger than a reference value corresponding to the unlocked state" according to the invention.

Here, the damping gain D2lock for locking control is a value that is adequately large relative to the damping gain D2base for ordinary control. Since an increase in the damping gain D2 acts to increase the effect of the speed control block 100B when determining the drive voltage V, together with the gradual change in the steady state gain P as previously described (action relating to Step S106), the speed control block 100B demonstrates a controlling role during execution period of locking control.

Once the damping gain D2lock for locking control has been set, the ECU 100 calculates a damping voltage Vd, which prescribes the drive voltage V of the VGRS motor 202, according to the following formula (2) (Step S109). Furthermore, the operation relating to Step S109 is equivalent to the operation of the amplifier 108 in FIG. 2.

$$Vd(n)=\theta'act \times D2lock \quad (2)$$

Once the steady state voltage Vp and the damping voltage Vd have been determined, the ECU 100 calculates the target drive voltage Vtag of the VGRS actuator 200 according to the following formula (3) (Step S110). Furthermore, the operation relating to Step S110 is equivalent to the operation of the subtractor 106 in FIG. 2.

$$Vtag=Vp(n)-Vd(n) \quad (3)$$

Once the target drive voltage Vtag has been determined, the ECU 100 drives the VGRS actuator 200 by controlling driving of the VGRS driving device 300 so that the determined target drive voltage Vtag is obtained (Step S111).

When the VGRS actuator 200 is driven, the ECU 100 determines whether or not locking of the VGRS actuator 200 by the locking mechanism 203 has been completed (Step S112).

Here, as was previously described, in this embodiment, control of the locking mechanism 203 during execution of locking control only consists of interrupting the application of current to the solenoid 203*c*, and strictly speaking, whether or not the lock lever 203*b* and the lock holder 203*a* have fit together cannot be detected.

Therefore, the ECU 100 terminates locking control at the point an experimentally preliminarily adapted amount of time has elapsed from the time of initiation of locking control. Namely, in Step S112, a determination is made as to whether or not the value of an internal time of the ECU 100, which was made to begin counting at the time of initiation of locking control, has reached a set value.

In the case locking has not been completed (when the elapsed time is less than the set value) (NO in Step S112), the ECU 100 returns processing to Step S102 and repeats the series of processing. In the case locking has been completed (when the elapsed time is greater than or equal to the set value) (YES in Step S112), the ECU 100 terminates locking control. Locking control is executed in the manner described above.

In this manner, according to the locking control according to this embodiment, increases in speed of the VGRS motor 202 caused by fluctuations in the steering load are restricted by (1) restricting increases in speed of the VGRS motor 202 as a result of the damping gain D2 of the speed control block 100B being switched to the damping gain for locking control D2lock, (2) restricting increases in speed of the VGRS motor 202 as a base property during locking control as a result of the steady state gain P of the position control block 100A being gradually reduced by a gradually changing amount ΔP3, and (3) correcting the steady state gain by increasing or decreasing relative to an increase or decrease in the steering load (the steering torque MT in this embodiment).

Namely, the robustness of the rotating speed of the VGRS motor 202 is improved, increases in speed of the VGRS motor 202 are at least restricted, and preferably that speed is decreased and ideally that speed is maintained at zero or close to zero. Thus, the physical impact when the lock lever 203*b* fits into the indentations in the lock holder 203*a* is alleviated.

Furthermore, in this embodiment, although the steady state gain P is basically shifted in the direction of reduction by the gradual change process relating to Step S106, in consideration of the previously described formula (1), reducing the steady state gain P is equivalent in meaning to reducing the positional deviation e. Thus, the ECU 100 may also reduce the positional deviation e by, for example, substituting the target position θtag for the current position θact instead of reducing the steady state gain P.

On the other hand, if the steady state voltage Vp is reduced, the effect of the damping voltage Vd1 on the position control voltage increases. Thus, if the damping gain D1 in the position control block 100A is increased while reducing the steady state voltage Vp, the effect of restricting increases in speed of the VGRS motor 202 can be adequately secured.

Namely, the "damping gain" according to the invention does not necessarily only refer to the damping gain D2, but may also refer to the damping gain D1. In providing a supplementary explanation thereof, the invention places the technical essence thereof on restricting increases in speed of the VGRS motor 202 during the locking control period, and which damping gain (or other gain having an equivalent action to damping gain) of the driving control system of the VGRS motor 202 is used to realize restriction of such increases in speed can be of various forms corresponding to the practical aspect of the driving control system.

Furthermore, in the locking control according to this embodiment, a characteristic technical matter for setting the steady state gain P corresponding to the steering load (the technical matter relating to the second controller according to the invention), and a characteristic technical matter for setting the damping gain D2 (or the damping gain D1 as previously described) to be sufficiently larger than a reference value during ordinary control (the technical matter relating to the first controller according to the invention) are both included therein, thereby enabling increases in speed of the VGRS motor 202 to be restricted extremely favorably.

However, it goes without saying that, even if these technical matters are respectively used independently, a sufficiently practical effect of restricting increases in speed of the VGRS motor 202 can still be obtained.

The invention is not limited to the embodiment described above, but rather can be suitably modified within a range that does not deviate from the purport or idea of the invention as can be determined from the claims and entire description thereof, and a controller of a steering transmission ratio variable device that results from incorporating such modifications is also included in the technical scope of the invention.

The invention can be used to control a steering transmission ratio variable device such as VGRS that enables variable control of steering transmission ratio.

The invention claimed is:

1. A control device of a steering transmission ratio variable device comprising:
a motor that is able to apply a driving force that promotes relative rotation between a steering output shaft coupled to wheels to be turned and a steering input shaft that applies a steering input to the steering output shaft to one of either the steering output shaft or the steering input shaft;
a motor driving device that drives the motor;
a locking device that is able to restrict the relative rotation;
a setting device that is configured to prescribe a drive voltage of the motor and set a gain that acts on the motor during a locking control period in which a state of the steering transmission ratio variable device switches from an unlocked state in which the relative rotation is not restricted to a locked state in which the relative rotation is restricted;
a determining device that is configured to determine the drive voltage of the motor based on the set gain;
a controller that is configured to control the motor driving device so that the determined drive voltage is supplied to the motor,
wherein the setting device sets a damping gain, which acts in a direction that reduces the rotating speed of the motor, to a value that is larger than a reference value corresponding to the unlocked state, while the determining device determines the drive voltage of the motor based on the set damping gain.

2. The device for controlling a steering transmission ratio variable device according to claim 1, wherein
the setting device determines the damping gain according to control rules of feedback control or feed forward control relating to position control and speed control of the motor.

3. The device for controlling a steering transmission ratio variable device according to claim 1, wherein
the setting device prescribes the locking control period as a period that includes time at which an engaging element of the steering input shaft and an engaging element of the steering output shaft have completely engaged together.

4. The device for controlling a steering transmission ratio variable device according to claim 1, wherein
the setting device sets a steady state gain, which acts in a direction that causes convergence of a positional deviation of the motor, in accordance with a specified steering load so as to correspond to the respective magnitude of an increase or decrease in the steering load, while the determining device determines the drive voltage of the motor based on the set steady state gain.

5. The device for controlling a steering transmission ratio variable device according to claim 1, wherein
the setting device sets a steady state gain, which acts in a direction that causes convergence of a positional deviation of the motor, in accordance with a specified steering load so as to correspond to the respective magnitude of an increase or decrease in the steering load, while the determining device determines the drive voltage of the motor based on the set steady state gain.

6. The device for controlling a steering transmission ratio variable device according to claim 5, wherein
the steady state gain is determined according to control rules of feedback control or feed forward control relating to position control and speed control of the motor.

7. The device for controlling a steering transmission ratio variable device according to claim 5, wherein
the steady state gain is increased when the steering load tends to increase or decreased when the steering load tends to decrease.

* * * * *